July 9, 1940.  H. M. MAERSCH  2,207,325
FOOD CONTAINER
Filed April 25, 1939

Helen M. Maersch
INVENTOR.
BY
ATTORNEYS.

Patented July 9, 1940

2,207,325

UNITED STATES PATENT OFFICE 2,207,325

FOOD CONTAINER

Helen M. Maersch, Sheboygan, Wis.

Application April 25, 1939, Serial No. 270,026

3 Claims. (Cl. 65—59)

This invention aims to provide a simple means for keeping food cold or hot, especially in the sick room, although the device is adapted to be used in homes, on airplanes, in restaurants, and wherever there may be need for an article of the kind shown in this application.

The invention aims to supply a device of the class described, which will be inexpensive to manufacture, and be capable of being taken down readily for cleaning or sterilization. Another object of the invention is to supply a device of the class described, so constituted that its constituent parts may be held in proper relation with respect to each other.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
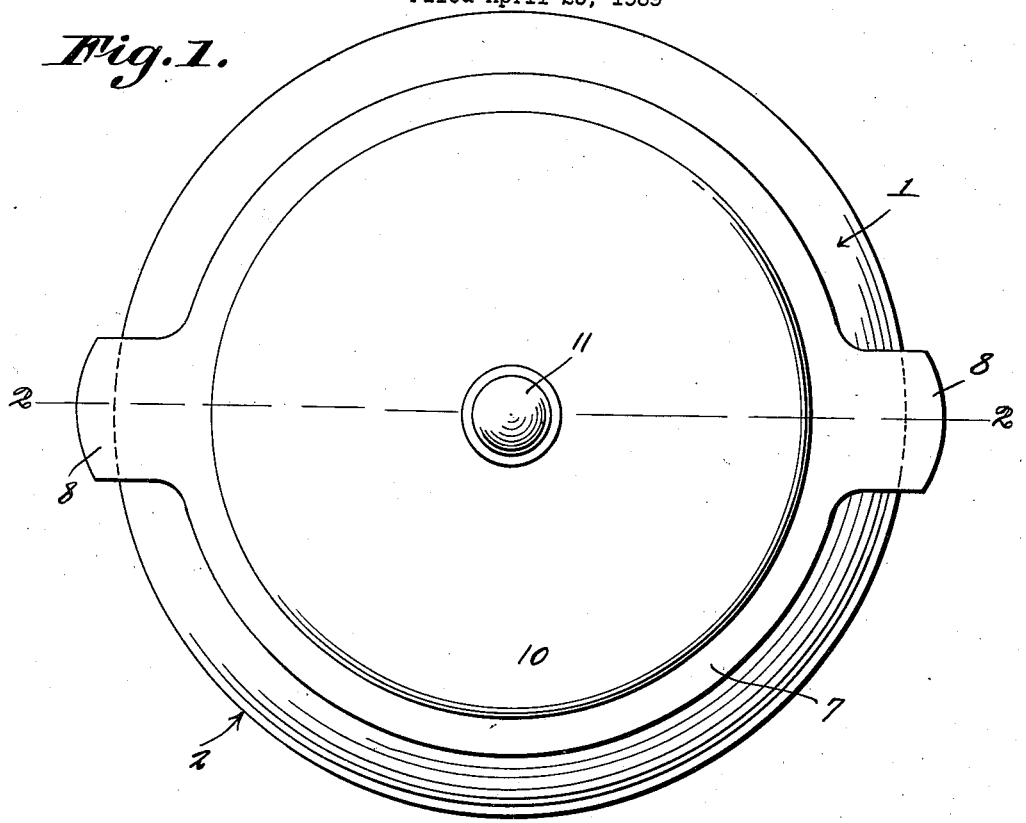
Fig. 1 shows in top plan, a device constructed in accordance with the invention.
Figure 2:
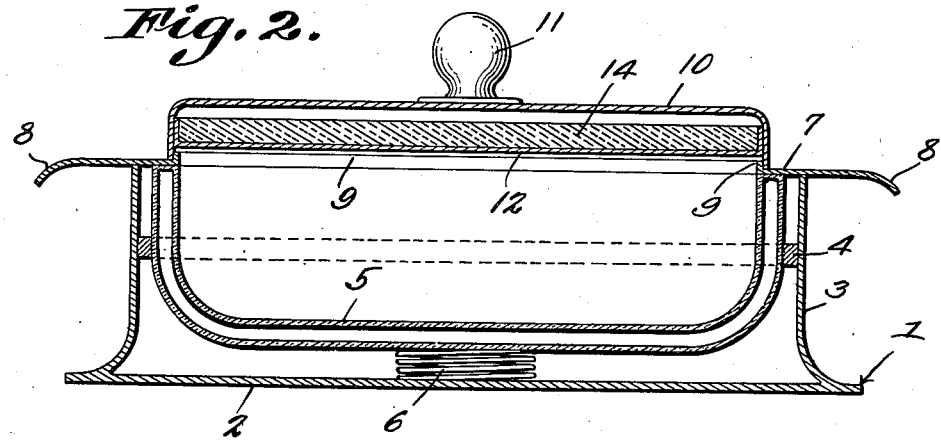
Fig. 2 is a transverse section on the line 2—2 of Fig. 1, parts remaining in elevation.

The device forming the subject matter of this application may be made, for the most part, from any of the attractive and sanitary metals or other materials on the market. It includes a casing 1, comprising a base 2 having a cylindrical, upstanding side wall 3, within which is secured a spacing ring 4.

A double walled bowl 5, of the Thermos type or otherwise, fits closely but removably within the spacing ring 4. In order to sustain the bowl 5 yieldably, and to prevent breaking shocks from being imparted to it, a resilient support, for example compression spring 6 is interposed between the bottom of the bowl 5 and the base 2 of the casing 1. The spring 6 may be secured either to the bottom of the bowl 5, or to the base 2 of the casing 1: or, if preferred, the spring 6 may be left free and unattached.

A closure ring 7 rests upon the upper end of the side wall 3 of the casing 1 and extends inwardly, over the upper end of the bowl 5. The closure ring 7 is equipped with oppositely disposed, outwardly extended, downwardly inclined handles 8. The closure ring 7 is equipped with a short upstanding sleeve 9, preferably alined vertically with the inner wall of the bowl 5.

The numeral 10 designates an inverted, cup-shaped cap, supported on the closure ring 7, and fitting closely but detachably about the sleeve 9 of the closure ring. At its center or elsewhere, the cap 10 is provided with a heat insulating handle or knob 11.

Within the cap 10 is secured a cup-shaped tray 12, spaced sufficiently from the sleeve 9 of the ring 7 so that the cap 10 may be supported on the closure ring 7. A layer of heat insulating material 14 fits closely within the tray 12 and may be fastened to the tray if preferred.

The operation and the advantages of the structure will be apparent from the drawing.

The bowl 5 is centralized and held in place by the ring 4, and the sleeve 9 on the ring 7, cooperating with the cap 10, serves to hold the cap removably in place. The entire structure may be taken down and washed, and the general construction is such that the objects set forth in the opening portion of this specification will be consummated.

Any suitable means may be provided for heating or cooling the structure hereinbefore described.

Having thus described the invention, what is claimed is:

1. A serving device for sustaining the temperature of a portion of food, comprising a casing, a bowl disposed within the casing, a spacer interposed between the side wall of the bowl and the side wall of the casing, a compression spring interposed between the bottom of the bowl and the bottom of the casing, a closure ring supported on the casing, above the bowl, the closure ring having an upstanding sleeve, an inverted cup-shaped cap fitting about the sleeve and supported on the closure ring, a tray secured within the cap, and insulating material carried by the tray and located within the cap.

2. A serving device for sustaining the temperature of a portion of food, comprising a casing, a bowl disposed within the casing, there being an annular air space between the side wall of the bowl and the side wall of the casing, a flat ring resting removably on the upper end of the casing, the ring extending across the upper end of the bowl, in contact therewith, and closing the top of the air space, the ring having an upstanding sleeve, the inner surface of which is flush with the inner surface of the bowl, and a cap surrounding the sleeve and resting on the ring.

3. A serving device for sustaining the temperature of a portion of food, comprising a casing, a bowl disposed within the casing, a spacer interposed between the side wall of the bowl and the side wall of the casing, a resilient support interposed between the bottom of the bowl and the bottom of the casing, a closure ring supported on the casing, above the bowl, the closure ring having an upstanding sleeve, an inverted cup-shaped cap fitting about the sleeve and supported on the closure ring, a tray secured within the cap, and insulating material carried by the tray and located within the cap.

HELEN M. MAERSCH.